(No Model.)

J. A. HIRSCH.
BICYCLE SUPPORT.

No. 567,980. Patented Sept. 22, 1896.

Witnesses:
Geo. W. Souny.
Henry Dankert.

Inventor:
Jonas A. Hirsch,
By H. G. Underwood
Worveres

UNITED STATES PATENT OFFICE.

JONAS A. HIRSCH, OF WATERTOWN, WISCONSIN.

BICYCLE-SUPPORT.

SPECIFICATION forming part of Letters Patent No. 567,980, dated September 22, 1896.

Application filed July 25, 1895. Serial No. 557,057. (No model.)

*To all whom it may concern:*

Be it known that I, JONAS A. HIRSCH, a citizen of the United States, and a resident of Watertown, in the county of Jefferson and State of Wisconsin, have invented certain new and useful Improvements in Bicycle-Supports; and I do hereby declare that the following is a full, clear, and exact description thereof.

My invention relates to devices for supporting bicycles when in a stationary condition, whether there be a rider upon the same or not; and it consists in certain peculiarities of construction and combination of parts, as will be fully set forth hereinafter, and subsequently claimed.

Figure 1:
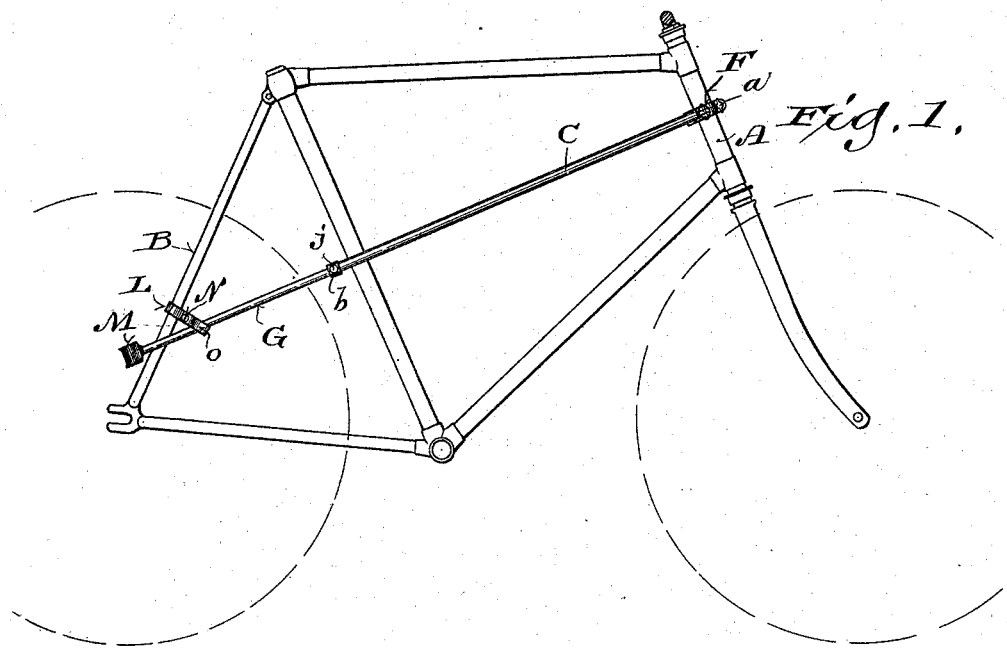
Figure 2:
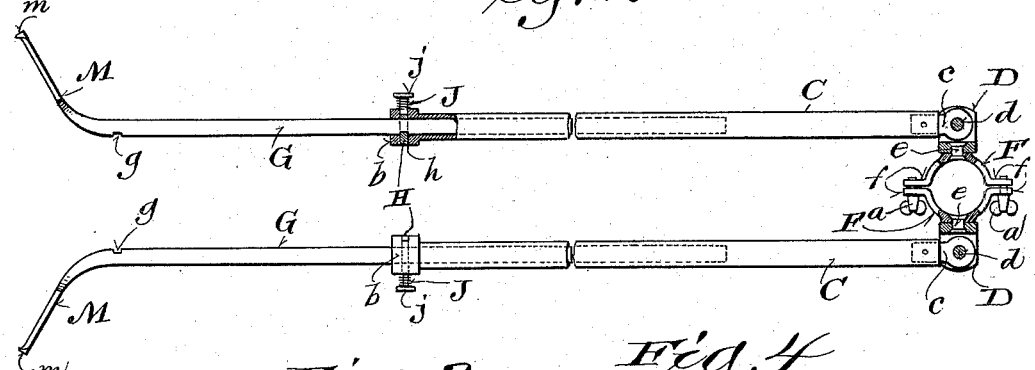
Figure 3:
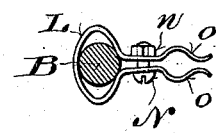
Figure 4:
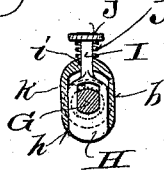

In the drawings, Figure 1 is a side elevation of my device shown in a raised position attached to the frame of a bicycle. Fig. 2 is a plan view of said device detached from the bicycle and partly in section or broken away to better illustrate details of construction. Fig. 3 is a detail view of one of the hangers or holding-clamps connected to the bicycle-frame to support the device out of the way when it is not in operation. Fig. 4 is a detail sectional view of part of the said device.

Referring to the drawings, A represents the steering-head of a bicycle, and B one of the rear braces of the frame thereof.

C C represent tubular stay-rods, forming portions of my device, fitted at their upper ends with pivot-plugs $c$ $c$, rigidly secured thereto, said plugs being pivoted, as shown at $d$ $d$, between the forks of bifurcated sockets D D, which latter are in turn swiveled, as shown at $e$ $e$, to the semicircular clamping-plates F F, which plates are adapted to embrace the steering-head A, as shown in Fig. 1. The said plates F are further provided with straight end extensions $f$ $f$, transversely perforated for the reception of the shanks of thumb-screws $a$ $a$, the perforations in one of the clamping-plates being smooth-bored and in the other screw-threaded, so that the said clamping-plate ends can be drawn toward each other by the action of the thumb-screws and the device closely held to the steering-head A by the impingement thereon of said clamping-plates, it being understood, of course, that the said steering-head is of greater diameter than that of the space between the said clamping-plates when they are brought together with their end extensions $f f$ in contact.

G G represent sliding rods movable within the tubular rods C C. These rods have parallel squared sides, and are provided at intervals with transverse notches $g$ $g$. The lower ends of the tubular rods C C are provided with housings $b$ $b$, containing slides H, whose outer ends project through slots $h$ in said housings, said slides having shanks I projecting through slots $i$ in the opposite sides of the said housings. These shanks I terminate in heads $j$, between which and the adjacent exterior walls of the housings the said shanks are surrounded by spiral springs J. The said slides are formed with slots $k$ therethrough for the passage of the described rods G, and the side edges of the walls of said slots are straight to correspond with the sides of said rods and prevent the latter from turning or twisting to one side. The rods G terminate in feet or plates M, preferably provided with downwardly-projecting points $m$, as shown.

In Fig. 3 I show one of the hangers or spring-holding clamps L, which are secured to the rear braces B of the bicycle-frame and clamped thereto by means of the screw-bolts N and nuts $n$. The said clamps L terminate in curved spring-arms $o$ $o$ to receive between them the rods G of my device when the latter is raised out of use, as shown in Fig. 1.

The operation of my device will be readily understood from the foregoing description of its construction, taken in connection with the accompanying drawings. When it is desired to support the bicycle in an upright position, the rods G G are freed from contact with the just-described spring-clamps L L and permitted to drop to the ground, when one of the compound rods G G will extend thereto from each side of the steering-head A, to which the upper end of the device is clamped, as shown and already described. The feet or plates M M at the lower ends of the rods G G will rest upon the ground, the described points $m$ $m$ aiding in making a securer contact, and the bicycle will be securely supported in an upright position, whether there is a rider upon the same or not. By means of the described notches $g$ in the sliding rods G the device can be readily adjusted to the height required for different makes or sizes of bicycles, and the slides H will firmly hold the said rods G at the length to which they have been adjusted.

Having thus described my invention, what I claim as new, and desire to secure by Letters Patent, is—

A bicycle-support comprising a pair of separable and adjustably-united semicircular clamping-plates, bifurcated sockets swiveled to said clamping-plates, pivot-plugs having rounded heads in engagement within the forks of said sockets, tubular stay-rods rigidly secured to the shanks of said pivot-plugs, sliding rods movable within the said tubular stay-rods and provided at intervals with transverse notches, said sliding rods being bent outwardly at their lower ends, and terminating in sharp-pointed feet or holding-plates, slotted housings upon the lower ends of the said tubular stay-rods, and slides having spring-controlled shanks projecting through the slots in said housings, substantially as set forth.

In testimony that I claim the foregoing I have hereunto set my hand, at Watertown, in the county of Jefferson and State of Wisconsin, in the presence of two witnesses.

JONAS A. HIRSCH.

Witnesses:
HENRY BIEBER,
ELSIE BIEBER.